United States Patent
Jaynes et al.

(10) Patent No.: US 11,489,891 B2
(45) Date of Patent: Nov. 1, 2022

(54) VIRTUAL VIDEO DRIVER BRIDGE SYSTEM FOR MULTI-SOURCE COLLABORATION WITHIN A WEB CONFERENCING SYSTEM

(71) Applicant: Mersive Technologies, Inc., Denver, CO (US)

(72) Inventors: Christopher O. Jaynes, Denver, CO (US); Scott Allen Ruff, Fort Collins, CO (US)

(73) Assignee: MERSIVE TECHNOLOGIES, INC., Denver, CO (US)

( * ) Notice: Subject to any disclaimer, the term of this patent is extended or adjusted under 35 U.S.C. 154(b) by 0 days.

(21) Appl. No.: 15/748,498

(22) PCT Filed: Jul. 28, 2016

(86) PCT No.: PCT/US2016/044581
§ 371 (c)(1),
(2) Date: Jan. 29, 2018

(87) PCT Pub. No.: WO2017/019911
PCT Pub. Date: Feb. 2, 2017

(65) Prior Publication Data
US 2018/0227340 A1 Aug. 9, 2018

Related U.S. Application Data

(60) Provisional application No. 62/197,763, filed on Jul. 28, 2015.

(51) Int. Cl.
*H04L 65/403* (2022.01)
*H04N 7/14* (2006.01)
(Continued)

(52) U.S. Cl.
CPC ........ *H04L 65/403* (2013.01); *H04L 65/4015* (2013.01); *H04N 7/147* (2013.01); *H04N 7/15* (2013.01); *H04L 65/70* (2022.05)

(58) Field of Classification Search
CPC . H04L 65/403; H04L 65/607; H04L 65/4015; H04N 7/147; H04N 7/15
See application file for complete search history.

(56) References Cited

U.S. PATENT DOCUMENTS

| 7,328,239 B1 | 2/2008 | Berberian et al. |
| 2002/0126201 A1 | 9/2002 | Schmitt et al. |
| (Continued) | | |

OTHER PUBLICATIONS

European Patent Application No. 16831380.7, Extended Search and Opinion dated Feb. 1, 2019, 8 pages.

(Continued)

*Primary Examiner* — Jason D Recek
(74) *Attorney, Agent, or Firm* — Lathrop GPM LLP

(57) ABSTRACT

A system and method for receiving video from multiple sources, compositing those sources and then republishing the composited video as a source to a virtual camera driver endpoint. In one embodiment, the present method comprises displaying multiple media streams, represented by worksurface image on a shared display. The shared display worksurface image is then re-encoded, and the re-encoded composite image is transmitted to a client computer, where the re-encoded image is transcoded to simulate a device connected to the client computer. The transcoded media stream is then transmitted to a teleconferencing system.

14 Claims, 4 Drawing Sheets

(51) Int. Cl.
*H04N 7/15* (2006.01)
*H04L 65/401* (2022.01)
*H04L 65/70* (2022.01)

(56) References Cited

U.S. PATENT DOCUMENTS

| | | |
|---|---|---|
| 2008/0075095 A1 | 3/2008 | Suryanarayana et al. |
| 2010/0231556 A1 | 9/2010 | Mines et al. |
| 2012/0274730 A1 | 11/2012 | Shanmukhadas et al. |
| 2012/0314018 A1* | 12/2012 | Wengrovitz ........... H04N 7/181 348/14.08 |
| 2014/0240445 A1 | 8/2014 | Jaynes |
| 2014/0267577 A1 | 9/2014 | Weber et al. |
| 2014/0372614 A1* | 12/2014 | Tan ....................... H04L 47/805 709/226 |
| 2015/0067106 A1 | 3/2015 | Jaynes et al. |
| 2015/0077509 A1 | 3/2015 | Ben Natan et al. |
| 2015/0281710 A1* | 10/2015 | Sievert ............... H04N 21/4424 375/240.02 |

OTHER PUBLICATIONS

International Search Report of PCT/US2016/044581 dated Oct. 20, 2016, 1 pp.
Chinese Patent Application No. 201680056291.3, English translation of Office Action dated Oct. 16, 2019, 15 pages.
Communication pursuant to Article 94(3) EPC for EP 16831380.7 dated Jul. 8, 2020, 6 pages.

\* cited by examiner

VIRTUAL VIDEO DRIVER BRIDGE SYSTEM FOR MULTI-SOURCE COLLABORATION WITHIN A WEB CONFERENCING SYSTEM

RELATED APPLICATIONS

This application claims the benefit of priority of U.S. Provisional Application Ser. No. 62/197,763, filed Jul. 28, 2015 and which is incorporated herein in its entirety.

BACKGROUND

Video distribution systems are typically focused on delivering video from one system to one or more receiver endpoints. For example, a traditional internet video server delivers video to a set of clients who connect and request the video to be streamed to their own device. Alternatively, servers can retransmit video to other servers to achieve load-balancing or ensure that video is being transmitted to clients with lower latency than would be possible from a single, fixed source on the network.

These approaches are appropriate when delivering a single source of video to one or more participants but do not scale well when many sources are to be transmitted to potentially many endpoints. They are also typically limited to one-directional video streaming where a sender transmits video to one or more endpoints, but the endpoints are not simultaneously sharing video with one another. Use cases that these system address are video-on-demand servers, or video sharing systems where one video to many users is presented.

In the case of web conferencing software, users are able to share video sources (i.e. a video camera or their desktop) to other users who are connected to the shared video session. These systems utilize a common endpoint.

SUMMARY

Disclosed herein is a system that receives video from multiple sources, composites those sources and then republishes the composited video as a source to a virtual camera driver endpoint. The embodiments disclosed herein allow for a collaborative video streaming system and method that allows multiple users to share various video sources to the same display.

In prior art systems, source computers may share video and other media to a shared display worksurface, enabling multiple sources to take place in a visualization and collaboration session for users who are viewing the display. This unique approach is important for collaborative viewing of multiple media sources on a single, compositive worksurface but cannot support more traditional video distribution systems in an obvious manner.

Consider, for example, three users with three different client devices streaming media to a shared display. Each of those users has connected to an in-room host controller that receives the input media (video) stream from each of the connected clients. These video streams are decoded and displayed within a worksurface image that is presented to the three users in the conference room. Suppose that two additional users are participating in the meeting using a traditional web conferencing system. Those two users are not connected to the display with a client but wish to view the shared screen via their web conferencing application.

In the present scenario, clients that are attached to multi-source video sharing system are able to stream media sources to a shared worksurface over a network connection. Those same clients can be used as conferencing endpoints in a web-conference application. At least one goal of embodiments of the present disclosure is to allow a shared worksurface image to be integrated with traditional web conferencing systems.

Because the shared worksurface may contain multiple video sources that are composited from many client devices, the present embodiments allow the web conferencing system to share many sources of content simultaneously, in a single video stream which traditional web conferencing systems do not support. In this way, each of the endpoints of a web conference can potentially be sharing many sources of content.

DETAILED DESCRIPTION OF THE EMBODIMENTS

The present system and method operates in an environment in which a plurality of source computers are connected to a particular collaboration session, with one or more media sources from at least one of the source computers being displayed on a central shared display and also displayed on at least one of the source computers.

The present method allows the shared worksurface to present itself to web conferencing endpoints as a traditional camera source.

Thus any Web Conferencing that accepts conferencing cameras as a valid input source can ingest the shared worksurface without specific application integration.

Figure 1A:
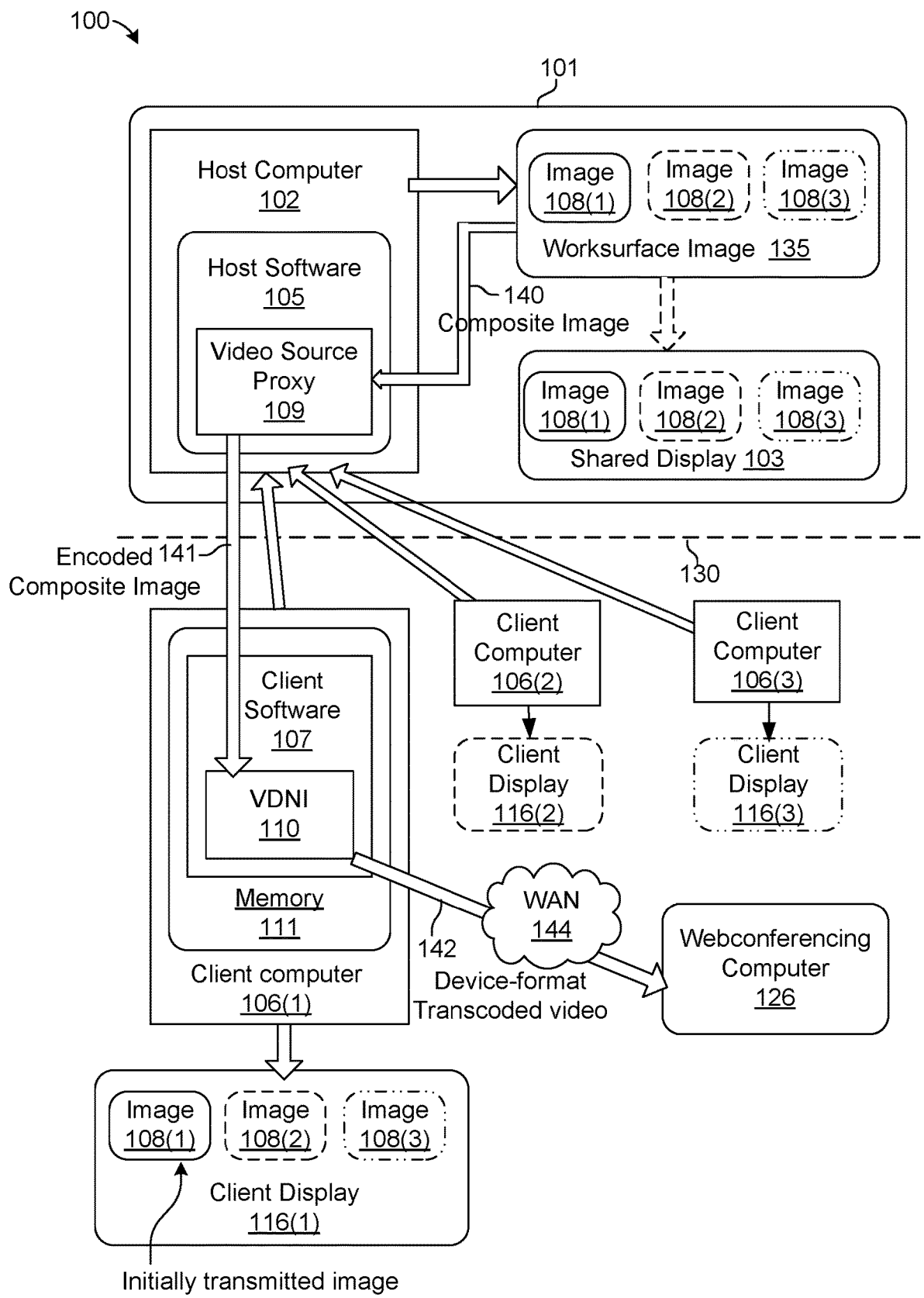
FIG. 1A is a diagram illustrating exemplary components of the present system.

FIG. 1A shows exemplary components of the present system 100, which comprises a host computer 102 and one or more client computers 106(*) [where the "*" symbol indicates an arbitrary device] which communicate with system 102 via a network 130 such as the Internet. As shown in FIG. 1, in an exemplary embodiment, host computer 102 includes host controller 104, associated data storage 110, and shared display 103. Host controller 104 may include a digital processor that executes host software 105 to provide the functionality described herein. It should be appreciated that host software 105 and host controller 104 may be implemented using discrete logic circuits, or other form of firmware, software, or hardware, without departing from the scope hereof. Users may view a shared worksurface image 135 on the host computer shared display 103 together for a shared view. Worksurface image 135 is stored in memory accessible to host computer 102.

Each client computer 106 may be any type of computer-controlled device with a digital processor 121 and a display 116, such as a desktop or laptop computer, tablet, or smart phone, etc. A client software application 107, resident in memory 111 in each source computer 106, may be implemented as transitory or non-transitory computer readable instructions that, when executed by digital processor 121 implement the functionality and tasks as described in detail below. It should be appreciated that software application 107 and digital processor 121 may be implemented using discrete logic circuits, or other form of firmware, software, or hardware, without departing from the scope hereof.

Figure 1B:
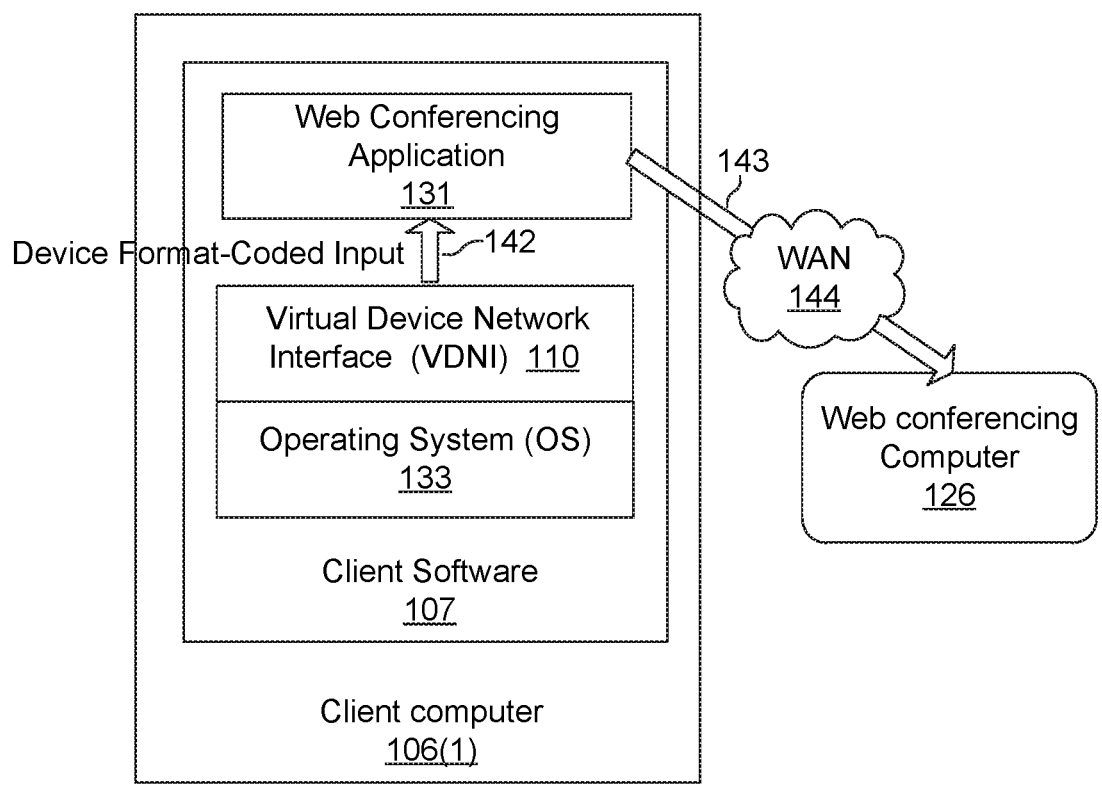
FIG. 1B provides a more detailed view of the system shown in FIG. 1A.

A more detailed view of FIG. 1A is shown in FIG. 1B. As shown in FIG. 1B, client computer 106(1) includes client software 107, which includes an operating system (OS) 133, a virtual device network interface (VDNI) 110, and a web conferencing endpoint application 131.

A web conferencing endpoint 131 is software (or discrete logic circuitry as discussed above) running on a client computer 106 that is able to connect to a web conferencing service and share various sources. These typically include the client computer screen and one or more connected cameras. A user operates the web conferencing endpoint by selecting different sources to share as well as exercising other features common to web conferencing systems. By way of example, a user may initiate a call with a remote user (shown at right above), type into a chat window, and activate a connected web camera to allow remote viewers to view the user. Embodiments discussed herein extend a traditional web conferencing system at least by introducing a Virtual Device Network Interface (VDNI) 110, which is software, installed on a client computer 106, that receives video and presents itself to a web conferencing endpoint 131 as a valid video source for web conferencing.

In one example, the VDNI 110 acts as a virtual camera, emulating a video (or other type of) camera device. A VDNI 110 may also emulate a virtual display. Either device will 'appear' to the client device 106 as a physical device that has been plugged into the client device 106. Once plugged in (connected to a video source proxy 109 over the network 130), the emulated devices are available as sources for the web conferencing application 131 running on the client device 106.

VDNI 110 provides a convenient abstraction layer between a multi-source sharing system 101 and a web conferencing endpoint, e.g., web conferencing application 131. The role of the VDNI 110 is to receive media frames (images or video) from the shared worksurface 135 and to transcode (re-encode) that data into a video stream 142 into a format compliant with the VDNI 110. This video stream 142 acts as the content source of the device being emulated by the VDNI 110. For example, if the VDNI is acting as a virtual camera, the shared worksurface image 135 is received and encoded as a live video stream being captured by a simulated camera device.

Communication between the VDNI 110 and a multi-source content sharing system 101 takes place over a network 130 and implements a protocol that allows the VDNI 110 to communicate directly with the host computer 102 of the sharing system. This allows the communication protocol between the host computer 102 and the VDNI 110 to be independent of the specific web conferencing endpoint being used on a client computer **106(*)**.

Any web conferencing software running on a client computer that supports, for example, a video camera source, allows users to interact with the virtual camera to enable its video, select it as a source, and transmit that source to remote users who are connected in the web conferencing session.

A 'Display Host-to-Client' communications protocol manages client connections and transports image frame data displayed on the shared display 103 to a client computer 106, is used to encode a video stream, indicated by arrow 141 in FIG. 1A. The client VDNI 110 receives this video stream 141 and converts it into a virtual video device protocol that represents a stream of images stored in a format that complies with existing video devices. For example, the Display Host-to-Client protocol may include partial frames as the host/client communicates over the network. 130. These frames can be buffered and then transcoded into a standard video stream (i.e., H.264) presented according to a known device driver format to the client computer software 107. Another protocol is employed to receive the transcoded VDNI data (indicated by arrow 143 in FIG. 1B) and send it over a WAN 144, to web conferencing computer 126, using web conferencing standards. Well-known methods are employed for the various protocol conversions used in the present system.

Figure 2:
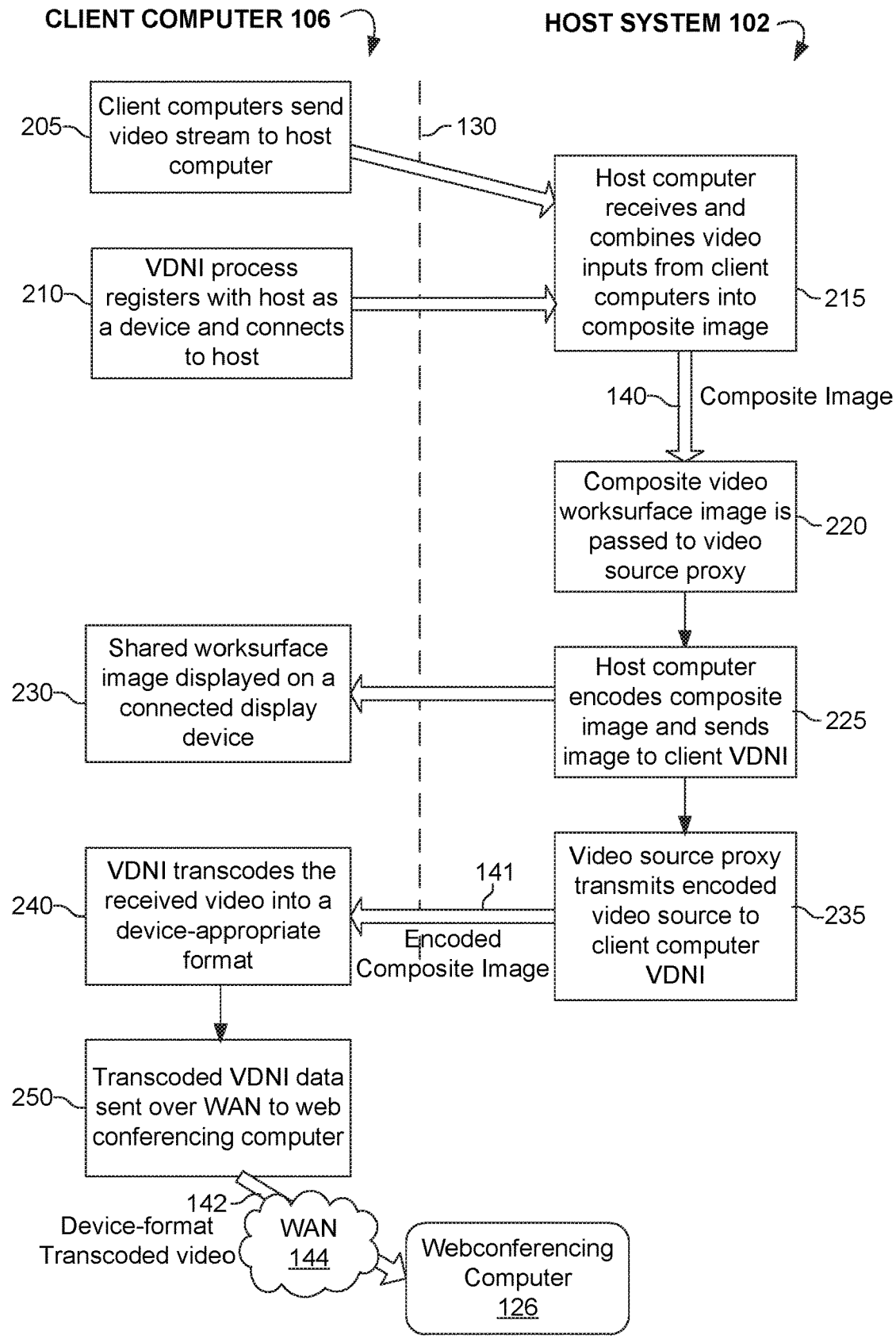
FIG. 2 is a flowchart showing an exemplary set of steps performed in an exemplary embodiment of the present system.

FIG. 2 is a flowchart showing an exemplary set of steps performed in an exemplary embodiment of the present system. In system operation, one or more users share media to a shared display system for collaborative visualization by connecting to host computer 102 and streaming video content to the host computer 102 using a media sharing application. A third-party web conferencing application 131 then selects the VDNI 110 as an input source for one of the client computers, e.g., computer 106(1) in FIG. 1A.

As shown in FIG. 2, in step 205, client computers 106 transmit a video stream to the host computer 102. At step 210, a VDNI process 110 on one of the client computers 106 (e.g., computer 106(1) in FIG. 1A) registers with host software 105, emulating a specific type of device, such as a video camera or a display device. Host software 105 notes that a new device was recently connected, and the VDNI process 110 connects to the shared display 103.

At step 215, host computer 102 receives and combines video, from two or more client computers 106, for display within a shared worksurface image 135. At step 220, the composite video image 140 (from the client computers) is passed to a video source proxy 109, resident in the host computer 102, which captures the shared worksurface image 135.

At step 225, the composited image 135, which is typically a video stream, is encoded by host software 105 and then and re-transmitted to the VDNI 110 on the registered client computer 106, via a Display Host-to-Client protocol. In step 230, the shared worksurface image is optionally displayed on a connected display device, e.g., shared display 103, to provide a collaborative view of the various client sources.

At step 235, the video source proxy transmits the encoded video source (worksurface video image 135 or a sequence of worksurface images) 141 to the client computer VDNI 110. At step 240, the VDNI exposes the received video in a format that is appropriate to the device it is emulating either a virtual display or virtual video camera. The VDNI 110 transcodes the video stream into a device-encoded video format 142 that represents a valid device on the host computer 102.

At step 245, a third-party web conferencing application 131, using interface controls already built-into the web conferencing software, then selects the VDNI 110 as an input source for one of the client computers 106 that supports sharing that device. Finally, at step 250, the transcoded VDNI data is sent over a WAN 144, to web conferencing computer 126.

Figure 3:
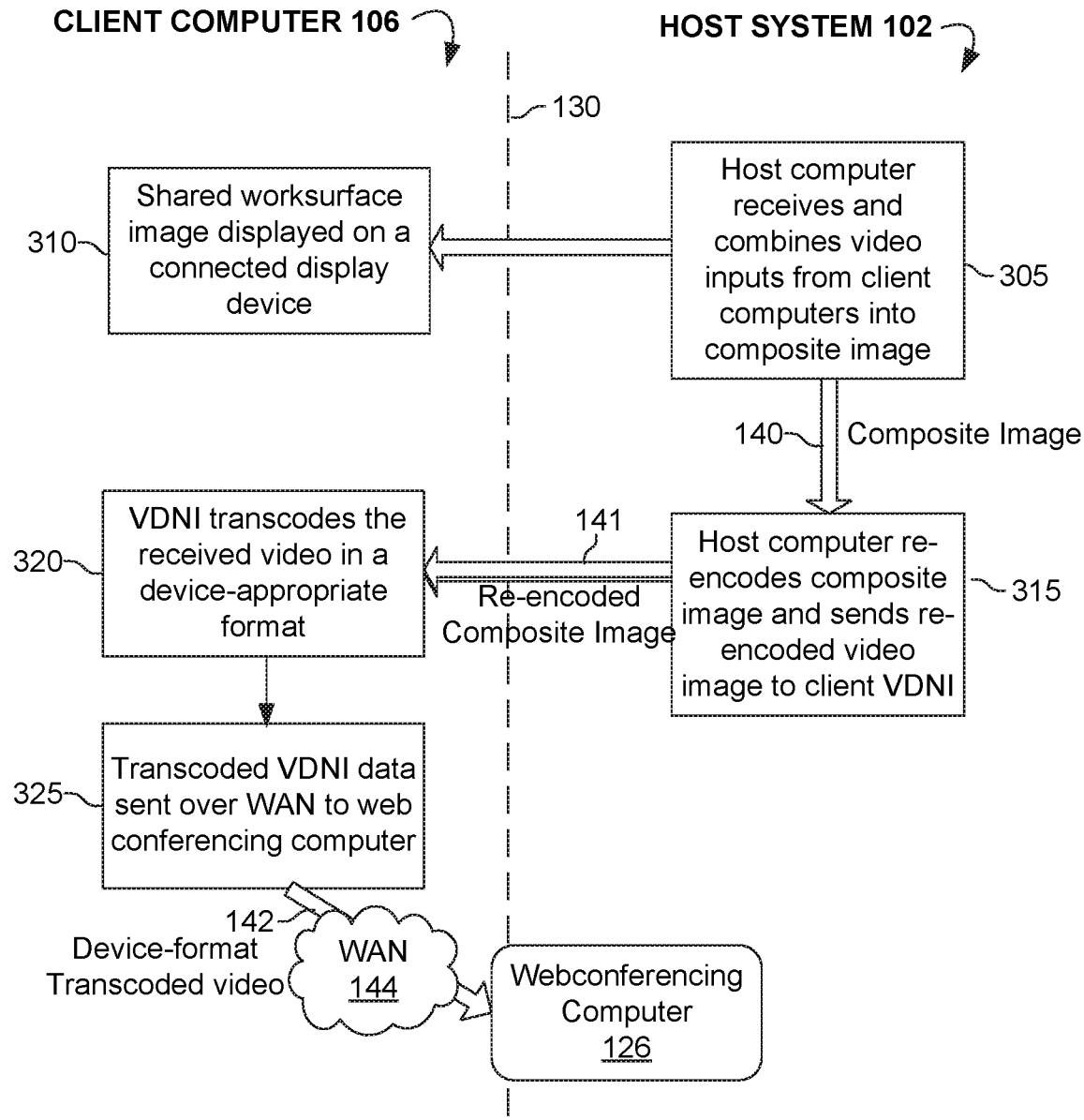
FIG. 3 is a flowchart showing an exemplary set of steps performed by at least one embodiment of the system disclosed herein.

In one embodiment, the present method comprises the following steps shown in FIG. 3. At step 305, multiple media streams, are received by host computer 102 and represented on a worksurface image 135, which is displayed on a shared display 103, at step 310. The shared display worksurface image 135 is re-encoded at step 315, and the re-encoded composite image 141 is transmitted to a VDNI 110. At step 320, the re-encoded image is transcoded to simulate a device connected to the VDNI 110. At step 325, the transcoded media streams are then transmitted, via a teleconferencing system, to a web conferencing computer 126.

The above description of certain embodiments of the invention is not intended to be exhaustive or to limit the invention to the precise forms disclosed. The terms used in the claims should not be construed to limit the invention to the specific embodiments disclosed in the specification, rather, the scope of the invention is to be determined by the following claims.

What is claimed is:

1. A system for multi-source collaboration, comprising:
a first client computer of a plurality of client computers, the plurality of client computers in communication with a host computer for sharing content between the plurality of client computers in a multi-source collaboration session, the first client computer including
a web conferencing application, and
a virtual device network interface performing operations of:
receiving an encoded composite image representing a worksurface image hosted by the host computer, the worksurface image including respective video streams from at least two of the plurality of client computers,
emulating a physical device that is communicatively coupled to the first client computer and available as a source for the web conferencing application when running on the first client computer, and
transcoding the encoded composite image into a transcoded video stream that simulates a content source of the physical device,
wherein the web conferencing application transmits the transcoded video stream to a web conferencing computer remote from the first client computer for display thereon.

2. The system of claim 1, the encoded composite image being a sequence of the worksurface image.

3. The system of claim 1, the encoded composite image being received from a video source proxy at the host computer.

4. The system of claim 3, the encoded composite image being received as an encoded video stream from the video source proxy according to a display host-to-client protocol.

5. The system of claim 1, the simulated device being a video camera.

6. The system of claim 1, the simulated device being a display device.

7. The system of claim 1, the simulated device being a device associated with the host computer.

8. A method for multi-source collaboration within a web conferencing system comprising:
receiving, at a host computer, a media stream from each of a first client computer and a second client computer, the first and second client computers connected to the host computer for participating in a multi-source collaboration session;
displaying, with the host computer, the multiple media streams on a shared display as a composite worksurface image;
receiving, with a virtual device network interface of the first client computer, the composite worksurface image as an encoded composite worksurface image;
emulating, with the virtual device network interface, a physical device that is communicatively coupled to the first client computer and available as a source for a web conferencing application running on the first client computer;
transcoding, with the virtual device network interface, the encoded composite worksurface image into at least one transcoded video stream that simulates a content source of the physical device; and
transmitting the at least one transcoded media stream via the web conferencing application, to a web conferencing computer remote from the first client computer.

9. The method of claim 8, further comprising re-encoding the encoded composite worksurface image prior to the step of transcoding.

10. A method for multi-source collaboration within a web conferencing system comprising:
combining media streams received at a host computer from two or more client computers connected to the host computer for participating in a multi-source collaboration session, the two or more client computers including a first client computer that includes a virtual device network interface;
representing the media streams on a shared worksurface;
sending a composite worksurface image of the shared worksurface to a video source proxy of the host computer;
encoding the composite worksurface image;
displaying the composite worksurface image on a display device, connected to the host computer, to provide a collaborative view of the media streams;
transmitting, via the video source proxy, the encoded composite worksurface image to the virtual device network interface, via a display host-to-client protocol;
emulating, with the first client computer, a physical device that is communicatively coupled to the first client computer and available as a source for web conferencing application running on the first client computer;
exposing, with the virtual device network interface, the received encoded composite worksurface image in a format that is appropriate to the physical device being emulated;
transcoding, with the virtual device network interface, the encoded composite worksurface image into a device-encoded video format that simulates a content source of the physical device;
selecting, via a web conferencing application running on the first client computer, the virtual device network interface as an input source for use in the web conferencing application; and
transmitting the transcoded composite worksurface image to a web conferencing computer remote from the first client computer.

11. The method of claim 10, wherein the encoded composite worksurface image is the worksurface video image.

12. The method of claim 10, wherein the encoded composite worksurface image is a sequence of worksurface images.

13. The method of claim 10, wherein the device being emulated is a display device.

14. The method of claim 10, wherein the device being emulated is a video camera.

* * * * *